April 27, 1954     O. H. SCHUCK     2,676,770
AUTOMATIC CRAB ANGLE REMOVAL APPARATUS FOR AIRCRAFT
Filed May 20, 1949     3 Sheets-Sheet 1

INVENTOR.
OSCAR HUGO SCHUCK
BY
*George H Fisher*
ATTORNEY

April 27, 1954   O. H. SCHUCK   2,676,770
AUTOMATIC CRAB ANGLE REMOVAL APPARATUS FOR AIRCRAFT
Filed May 20, 1949   3 Sheets-Sheet 2

Inventor
OSCAR HUGO SCHUCK

Attorney

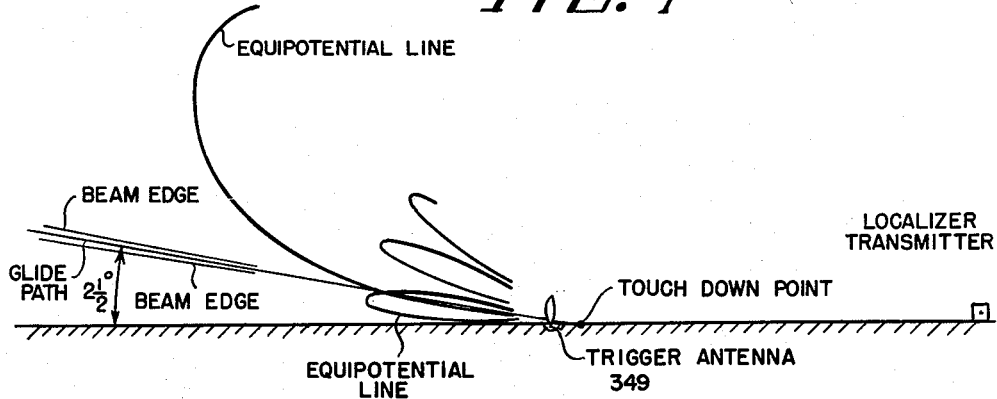
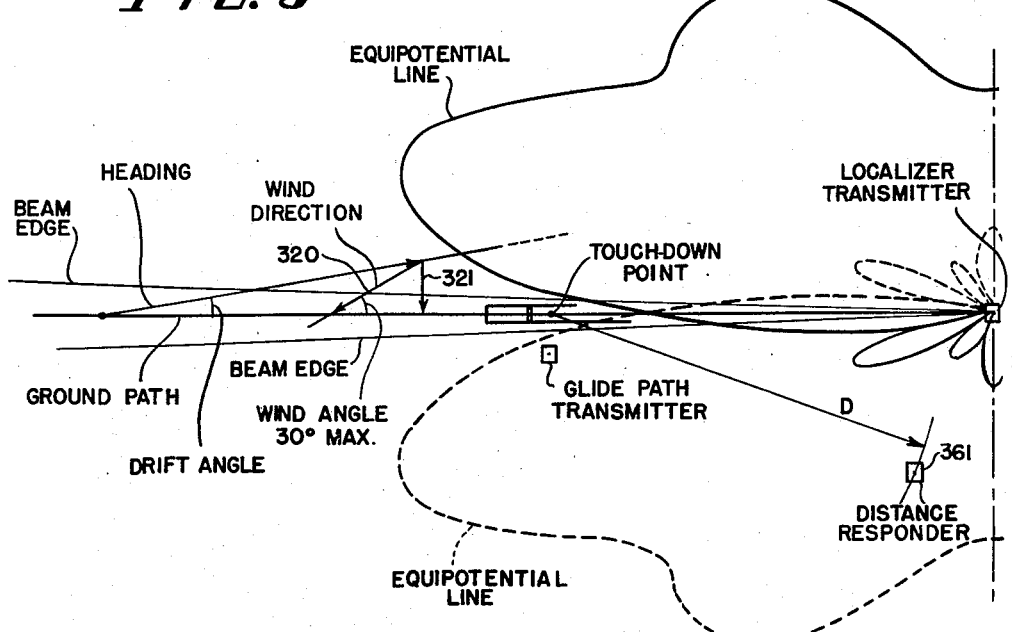

Patented Apr. 27, 1954

2,676,770

UNITED STATES PATENT OFFICE 2,676,770

AUTOMATIC CRAB ANGLE REMOVAL APPARATUS FOR AIRCRAFT

Oscar Hugo Schuck, Minneapolis, Minn., assignor to Minneapolis-Honeywell Regulator Company, Minneapolis, Minn., a corporation of Delaware Application May 20, 1949, Serial No. 94,321

16 Claims. (Cl. 244—77)

This invention relates to the field of aviation, and more particularly to means for automatically controlling the operation of a craft so that instrument landings may be safely accomplished in the presence of considerable crosswinds.

An aircraft which is making an instrument landing must follow a path with respect to the ground which is predetermined by the position of the localizer transmitter. Each transmitter is arranged to project a beam along the center of an airport runway, and in the absence of wind, or in the presence of wind aligned with the runway, the craft is heading, at the touchdown point, in the direction in which it is moving.

In the presence of wind having a component perpendicular to the runway the craft, in order to move along the beam, must be headed in a direction other than that in which it is traveling, the angular deviation between the two directions being the drift angle or crab angle of the craft. The magnitude of the crab angle varies with the magnitude of the crosswind for any given airspeed of the craft.

Under these conditions the axis of rotation of the landing wheels is not perpendicular to the direction of relative movement between the craft and the ground, and large components of force are exerted against the sides of the tires, wearing the tires, tending to force them off the wheels, and acting in a direction to roll the craft over on its side.

In manually controlled landings the human pilot overcomes these difficulties by "straightening out," using rudder and ailerons, in the last few seconds before the craft actually touches. Of course this is accompanied by a small amount of drift from the center of the course, but the time interval involved is so short that this drift is not appreciable. The effectiveness of ailerons at the low air speeds prevailing during landing is somewhat reduced from that during normal flight, and roll attitude control becomes rather ineffective. Control may still be exerted by the rudder at these low speeds, but this control too becomes undependably small before the craft stops. Control of the heading of the craft during the last stages of the landing is hence often exercised by differential power regulation.

While castering landing gear has been proposed as an answer to these difficulties, this solution is not entirely satisfactory, first because it requires a considerable investment in mechanical equipment, and second because as soon as the craft touches and begins to lose speed its heading no longer represents a proper relation between wind velocity and craft velocity, and the craft moves diagonally instead of straight along the runway.

The system proposed herein has the advantage of using the natural directive properties of fixed landing gear, which resists sideways forces applied to a rolling craft, and of using the automatic pilot with which the craft is in any case equipped to perform an additional function. The further apparatus required is relatively simple electronic equipment such as is already familiar to those working in the aviation field.

A broad object of the invention is to provide means for automatically removing the crab angle of an aircraft flying down a landing beam just as the craft is about to land.

A second object of the invention is to provide means altering the heading of a craft in accordance with the angular deviation between that heading and the directional movement of the craft.

Another object of the invention is to provide means for differentially altering the power settings of a craft in accordance with the angular deviation between the heading of the craft and its direction of movement.

Another object of the invention is to provide means for altering the heading of the craft, and differentially altering the power settings of the craft, in accordance with angular deviation between the heading of the craft and its direction of movement.

Another object of the invention is to provide means substituting drift angle control of heading for instrument landing control of heading when a craft is about to land.

Another object of this invention is to provide means as just described in which the substituting means is responsive to altitude.

Another object of the invention is to provide means as just described in which the substituting means is responsive to radio signals.

A further object of the invention is to provide means as just described in which the substituting means is responsive to distance from a point of known location with respect to the touchdown point.

A further object of the invention is to provide the combination of means normally controlling the heading of the craft so that it follows a landing path with means operable to change the heading of the craft so as to remove the crab angle.

A further object of the invention is to provide the combination of means normally equalizing the power supplied by the engines of a craft with means operative to differentially adjust the power supplied by the engines so as to cause power yaw.

It is a further object of the invention to provide the combination of means responsive to a radio signal for normally controlling the heading of a craft so that it follows a predetermined path with secondary means operable in response to radio signals to control heading of the craft so that it comes into alignment with the craft's direction of motion, and with means interrupting the normal control and initiating operation of the secondary means when the craft is about to land.

It is a further object of the invention to provide the combination of means normally adjusting the throttles of an aircraft to give equal manifold pressures with secondary means operable in response to radio signals to oppositely adjust the throttle settings so as to cause a power yaw, and with means interrupting the normal control and initiating operation of the secondary means when the craft is about to land.

It is a further object of the invention to provide means energizing the aileron and rudder controls of an automatic pilot for an aircraft in accordance with the output of a localizer receiver, or in accordance with the output of a crab angle receiver, depending on how near the craft is to landing.

It is a further object of the invention to provide means transferring control of the attitude of an aircraft from an instrument landing receiver to a crab angle receiver when the craft is about to land, and means preventing any subsequent movement of the craft from changing the control conditions thus established.

It is a still further object of the invention to provide means transferring control of the power of an aircraft from an instrument landing receiver to a crab angle receiver when the craft is about to land, and means preventing any subsequent movement of the craft when changing the control conditions thus established.

It is a still further object of the invention to provide means transferring control of the operation of the automatic pilot and the power control system of an aircraft from an instrument landing system to a crab angle receiver, in response to an altitude responsive member.

A still further object of the invention is to provide means as just described which includes means preventing reverse transfer of control from taking place.

A further object of the invention is to provide means for giving an output determined by the drift angle between the heading of a craft and its direction of movement.

A still further object of the invention is to provide a drift angle receiver including a number of antennas spaced from the longitudinal axis of the craft, a like number of rectifiers, lag lines and direct lines connecting signals from the antennas to the rectifiers, and means giving control outputs determined by the relation between the outputs of said rectifier.

Yet another object of the invention is to provide an apparatus as above described, in which the control outputs are supplied to attitude and power control apparatus in an aircraft when the craft is about to land.

Various other objects, advantages, and features of novelty, which characterize my invention, are pointed out in particularity in the claims annexed hereto and forming a part hereof. However, for a better understanding of the invention, its advantages, and objects obtained by its use, reference should be had to the subjoined drawing, which forms a further part, and to the accompanying descriptive matter, in which I have illustrated and described certain preferred embodiments of my invention. In the drawing:

Figures 4 and 5 are diagrams illustrative of the way in which the invention may be practiced.

Figure 1:
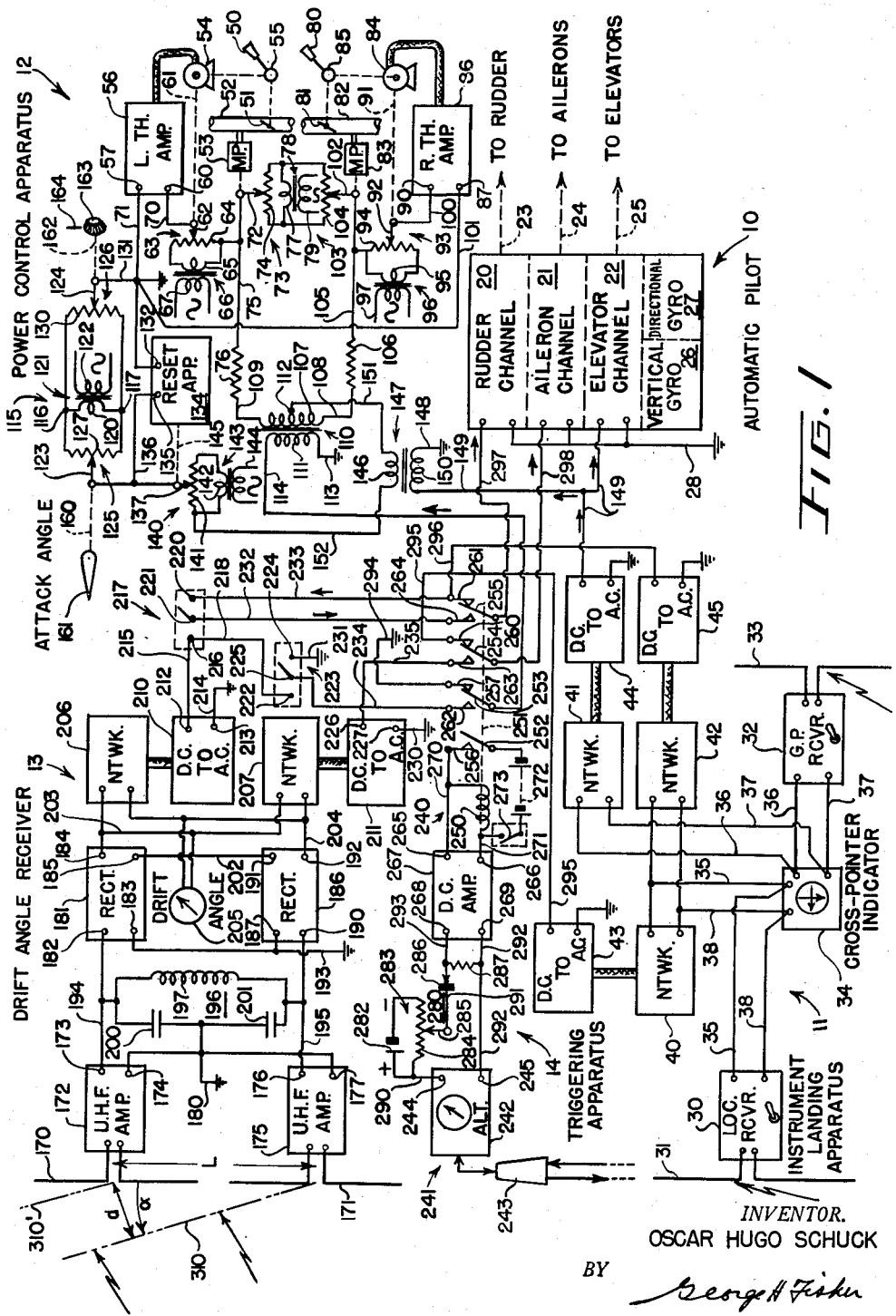
Figure 1 is a general showing of a complete system according to my invention.

The invention is shown in Figure 1 to comprise five principal components. An automatic pilot 10 for stabilizing the attitude of an aircraft about pitch, yaw, and roll axes is shown in the lower right hand portion of the figure. In the lower left hand portion of the figure there is shown the air-borne apparatus 11 of an instrument landing system whose function is to make it possible for a craft to follow a particular path in space in approaching an airport, and to land at a selected point, regardless of whether or not the human pilot is able to supervise the operation of the craft by visual observation. In the upper right hand corner of the figure there is shown power control apparatus 12 for regulating the power supplied by the engines of the aircraft, the control being normally in accordance with the attack angle of the craft. In the upper left hand corner of the figure there is shown a crab angle receiver 13 whose function is to supply an ouput whenever the longitudinal axis of the craft is not aligned with its direction of motion toward a radio transmitter. In the left central portion of the figure at 14 there is shown triggering apparatus which controls the manner in which the automatic pilot 10 and the power control apparatus 12 are overridden either by the instrument landing apparatus 11, or by the crab angle receiver 13, or by both. The principal components of the invention will now be considered individually in more detail.

Since many different kinds of automatic pilot are known, the showing of automatic pilot 10 given in Figure 1 is largely schematic, and does not include many of the refinements known to increase the perfection of such equipment. A rudder channel 20, an aileron channel 21 and an elevator channel 22 of the automatic pilot are shown as actuating the respective control surfaces of the craft through mechanical connections 23, 24 and 25 respectively; a vertical gyroscope 26 and a directional gyroscope 27 are shown as providing standards of attitude with respect to which the attitude of the craft may be controlled.

The instrument landing apparatus 11 is shown to comprise a localizer receiver 30 having a dipole antenna 31, a glide path receiver 32, having a dipole antenna 33, and a cross pointer indicator 34 energized from these two receivers in a manner well known to those skilled in the art. When the craft carrying receivers 30 and 32 are located exactly on the landing path, no voltage is applied to the cross pointer indicator from either receiver, and the needles are in their central zero position. If the craft departs in one direction or the other from the center of the beam horizontally, a unidirectional voltage of one polarity or the other appears between conductors 38 and 35 and displaces the normally vertical needle of indicator 34. Similarly, if the craft is displaced from the landing beam vertically, a voltage appears between conductors 36 and 37 and displaces the normally horizontal needle of cross pointer indicator 34 from its central position. If the system is to be used in a manually controlled aircraft, the human pilot simply operates the control stick and the rudder pedal, controlling the attitude and directional movement of the craft to bring the two needles of the cross point indicator to their central position. If automatic control of the craft is to be maintained, the voltages between conductors 38 and 35 and conductors 36 and 37 are used as signals to indicate the need of operation of appropriate control surface operators.

The characteristics of the radio-maintained landing path are subject to variation, particularly as regards transients, and craft of various types respond in various fashions to application of controlling forces. Therefore, the voltages between conductors 38 and 35 and conductors 36 and 37 are impressed on networks 40, 42 and 41, which are arranged to have such integrating, differentiating, or filtering characteristics as are found necessary to give overall smooth control of the craft. Each network, whose output is a unidirectional voltage of small variable magnitude and reversible polarity, is arranged to energize a unit which functions as a combined power amplifier and D. C. to A. C. converter, giving an alternating output voltage which varies in amplitude and reverses in phase with variations in the magnitude and reversal in the polarity of the input to the unit. Thus network 40 energizes unit 43, network 41 energizes unit 44 and network 42 energizes unit 45. The output from unit 43 provides overriding control on the aileron channel 21 of automatic pilot 10, and the ouput from units 44 and 45 provide overriding control on the elevator channel 22 and the rudder channel 20 of the automatic pilot respectively. In addition, the output from unit 44 also supplies overriding control to power control apparatus 12 as will presently be described. It will be appreciated that if the control characteristics of the aircraft combined with the automatic pilot are substantially the same about all its axes, and if the characteristics of the localizer and glide path signals of the instrument landing system are also alike, the functions of two or more of units 40, 41 and 42 and units 43, 44 and 45 may be combined.

Power control apparatus 12 is shown as applied to a twin engine craft. A left throttle lever 50 is shown as controlling the left throttle 51 so as to regulate the power supplied by the left engine, not shown, and also so as to vary the pressure in intake manifold 52, which is sensed by a manifold pressure responsive device 53. The position of throttle 51 may also be adjusted by a motor 54, an override mechanism 55 being provided so that manual control of throttle 51 may be exercised by lever 50, regardless of the operation or lack of operation of motor 54. Energization of motor 54 is provided from left throttle amplifier 56, which is in turn energized at input terminals 57 and 60 through a circuit which will presently be traced. Motor 54 also actuates, through a mechanical connection 61, the slider 62 of a voltage divider 63 whose winding 64 is energized from the secondary winding 65 of a transformer 66 having a normally energized primary winding 67. Slider 62 is connected to input terminal 60 of amplifier 56 by a conductor 70, and input terminal 57 of the amplifier is connected to ground through a conductor 71.

Manifold pressure responsive device 53 mechanically actuates the slider 72 of a voltage divider 73 having a winding 74. Slider 72 and one terminal of winding 64 of voltage divider 63 are connected by a conductor 75 to one terminal of a fixed resistor 76. Winding 74 is energized from the secondary winding 77 of a transformer 78 having a normally energized primary winding 79.

A right throttle lever 80 is shown as controlling the right throttle 81 so as to regulate the power supplied by the right engine, not shown, and also so as to vary the pressure in intake manifold 82, which is sensed by a manifold pressure responsive device 83. The position of throttle 81 may also be adjusted by a motor 84, an override mechanism 85 being provided so that manual control of throttle 81 may be exercised by lever 80, regardless of the operation or lack of operation of motor 84. Energization for motor 84 is provided from right throttle amplifier 86, which is in turn energized at input terminals 87 and 90 through a circuit which will presently be traced. Motor 84 also actuates, through a mechanical connection 91, the slider 92 of a voltage divider 93 whose winding 94 is energized from the secondary winding 95 of a transformer 96 having a normally energized primary winding 97. Slider 92 is connected to input terminal 90 of amplifier 86 by a conductor 100, and input terminal 87 of the amplifier is connected to ground through a conductor 101.

Manifold pressure responsive device 83 mechanically actuates the slider 102 of a voltage divider 103 having a winding 104. Slider 102 and one terminal of winding 94 of voltage divider 93 are connected by a conductor 105 to one terminal of a fixed resistor 106. Winding 104 is energized from secondary winding 77 of transformer 78.

Resistors 76 and 106 are connected by conductors 109 and 108 to the terminals of the secondary winding 107 of a transformer 110 having a primary winding 111. Winding 107 is center tapped at 112, and electrical connection is made to primary winding 111 through ground connection 113 and a conductor 114.

Power control apparatus 12 also comprises a bridge 115 having input terminals 116 and 117 energized from the secondary winding 120 of a transformer 121 having a normally energized primary winding 122, and a pair of output terminals comprising the sliders 123 and 124 of a pair of voltage dividers 125 and 126 having windings 127 and 130 all respectively. Output terminal 124 is grounded by a conductor 131, as is one input terminal 132 of a reset apparatus 134 having a second input terminal 135 connected to slider 123 by a conductor 136. Conductor 136 is also connected to the slider 137 of a voltage divider 140 whose winding 141 is energized from the secondary winding 142 of a transformer 143 having a normally energized primary winding 144. Slider 137 is actuated by a mechanical output 145 from reset apparatus 134. The secondary winding 146 of a transformer 147 having a primary winding 150 is connected to center tap 112 of transformer 110 by conductor 151, and to one terminal of winding 141 by a conductor 152. One terminal of primary winding 150 is grounded at 148; the other is energized through a conductor 149.

Slider 123 is arranged for operation by a mechanical connection 160 to an attack angle sensing vane 161, which is mounted in any suitable fashion for positioning by the relative wind so that it becomes aligned therewith. Slider 124 is arranged to be operated by a mechanical connection 162 to a manual knob 163 rotatable with respect to an index 164, so as to select a position of slider 123 at which bridge 115 will be balanced.

Crab angle receiver 13 is shown to comprise a pair of dipole antennas 170 and 171. These antennas are mounted on the wings of the craft to lie in a line perpendicular to the longitudinal axis of the craft, and are normally equally spaced from the axis. Antenna 170 energizes a first ultra-high frequency amplifier 172 having a pair of output terminals 173 and 174, and antenna 171 energizes the second ultra-high frequency amplifier 175 having output terminals 176 and 177. Any suitable phase-stable amplifiers capable of operating at the selected frequency are suitable for use in this application. Terminals 174 and 177 are grounded at 180.

The output from amplifier 172 directly energizes a rectifier 181 having input terminals 182 and 183 and output terminals 184 and 185. Amplifier 175 directly energizes a rectifier 186 having input terminals 187 and 190 and output terminals 191 and 192. Terminals 183 and 187 are grounded at 193. Terminals 173 and 182 are connected by a conductor 194, and terminals 176 and 190 are connected by conductor 195. Connected between conductors 194 and 195 is a lag line 196, comprising an inductor 197 and a pair of capacitors 200 and 201 connected to ground at 180.

From the connections recited above, it will be apparent that amplifier 172 is connected to energize rectifier 181 directly, and to energize rectifier 186 through lag line 196. Likewise amplifier 175 is connected to energize rectifier 186 directly, and to energize rectifier 181 through lag line 196.

Output terminal 185 is connected to output terminal 191 by conductor 202. Output terminals 184 and 192 are connected by conductors 203 and 204 to a drift angle indicator 205. The sense of the connection is so made that if the outputs of the two rectifiers are equal, the indicator is not displaced from a central zero position, while if the rectifier outputs become unequal, the indicator needle is displaced in one direction or the other, depending upon which of the rectifier outputs is the greater.

A pair of networks 206 and 207 is connected, in parallel with indicator 205, to the combined outputs of rectifiers 181 and 186. These networks are of the same general nature as networks 40, 41 and 42 described in connection with the instrument landing apparatus, and each functions to give such integrating or differentiating characteristics as may be desired to the control system including the network. Network 206 energizes a unit 210, and network 207 energizes a unit 211, both units being similar to units 43, 44 and 45 previously described, and giving alternating voltage outputs which vary in amplitude and reverse in phase with variation in the magnitude and reversal in the polarity of a unidirectional voltage applied to the network.

Network 210 has output terminals 212 and 213, the latter being grounded at 214. Terminal 212 is connected by a conductor 215 to one fixed contact 216 of a first single pole double throw switch 217 having a further fixed contact 220 and a switching contact 211, and to one fixed contact 222 of a second single pole double throw switch 223 having a further fixed contact 224 and a switching contact 225. Unit 211 has output terminals 226 and 227, the latter being grounded at 230. Fixed contact 224 of switch 223 is grounded at 231. Conductors 232, 233, 234, and 235 are connected to switching contact 221, fixed contact 220, switching contact 225, and output terminal 226, by which electrical connection is made to the remainder of the system.

Triggering apparatus 14 remains for discussion, and comprises essentially a relay 240 controlled in the modification of the invention shown in Figure 1, by a supersonic altimetric apparatus 241. The altimeter proper is shown at 242, and the transducer, which both transmits and receives sonic energy, is indicated schematically at 243. Apparatus 241 is of the type which gives, at a pair of output terminals 244 and 245, a unidirectional output voltage which varies in accordance with the altitude of the craft. Any of the known methods for accomplishing this function may be used in this connection. Patent 2,346,093 may conveniently be referred to as one disclosure of means suitable for this use.

Relay 240 is shown to comprise a winding 250 which cooperates with a core 251 to actuate a plurality of switching contacts 252, 253, 254, and 255. A fixed contact 256 engages switching contact 252 in the energized condition of the relay. Switching contacts 253, 254 and 255 are normally in engagement with fixed contacts 257, 260, and 261, but upon energization of the relay the switching contacts move into engagement with fixed contacts 262, 263 and 264, all respectively.

Relay 240 is energized from the output terminals 265 and 266 of a D. C. amplifier 267, through conductors 270 and 271. There is also supplied a holding battery 272 controlled by a manual switch 273. When this switch is closed, and when relay 240 moves into its actuated position, a holding circuit may be traced through winding 250, switch 273, battery 272, switching contact 252, and fixed contact 256, which maintains the relay in its engaged position until switch 273 is opened.

A threshold adjusting arrangement 280 also comprises a portion of triggering apparatus 14, and is seen to comprise a battery 282, a voltage divider 283 comprising a winding 284 and a slider 285, a rectifier 286, and a resistor 287. Winding 284 is energized from battery 282, and one end of the winding is connected to output terminal 244 of altimeter 242 by conductor 290. Slider 285 of voltage divider 283 is connected in a series circuit with rectifier 286, resistor 287 and output terminal 245 of altimeter 242 by conductors 291 and 292, and the voltage drop across resistor 287 is impressed upon input terminals 268 and 269 of amplifier 267 by conductors 293 and 292.

Fixed contact 257 of relay 240 is grounded at 294. Conductor 234 is connected to fixed contact 262 of the relay, conductors 232 and 233 are connected to fixed contacts 264 and 261 of the relay, and conductor 235 is connected to fixed contact 263 of the relay. In addition, the output of unit 43 is connected to fixed contact 260 of the relay by a conductor 295, and the output of unit 45 is connected to fixed contact 261 of the relay by conductor 296.

Switching contact 255 of the relay is connected to the input of the rudder channel of the automatic pilot by conductor 297; switching contact 254 is connected to the input to the aileron channel of the automatic pilot by a conductor 298, switching contact 253 of the relay is connected to transformer 110 of the power control apparatus by conductor 114, and transformer 155 in the power control apparatus is connected to an output terminal of unit 44, and to the input terminal of elevator channel 22 by conductor 149.

*Operation*

The combination of components 10, 11 and 12 as shown in Figure 1 comprises the subject matter of the copending application of Alderson and Schuck, Serial Number 68,238, filed December 30, 1948 and assigned to the assignee of the present application. Its operation is given there in great detail: the present application, therefore, will be only general as far as this subject matter is concerned.

In normal cross country flight of an aircraft the automatic pilot controls the rudder, ailerons and elevators of the craft to maintain a desired roll and pitch attitude, under the control of vertical gyroscope 26, and a desired yaw attitude or heading, under the control of the directional gyroscope 27. Means for "trimming" each channel of the automatic pilot, that is, for selecting a desired attitude about each axis, are of course provided as is conventional with automatic pilots, and a manual turn control is also a very useful adjunct to the system: these refinements are not shown in Figure 1. Apparatus 11 is not energized during normal flight, so that units 43, 44 and 45 supply no output either to the automatic pilot or to the power control apparatus.

Power control apparatus 12 functions in normal flight to control the position of throttles 51 and 81. The input to left throttle amplifier 56 comprises the sum of six voltages: the unbalance voltage of bridge 115, the output of voltage dividers 140 and 63, the voltage drop in resistor 76, the voltage induced in the upper half of secondary winding 107, and the voltage induced in secondary winding 146. In normal flight the two last named voltages are both zero, and the input resistance between terminals 57 and 60 of amplifier 56 is so high that no signal current flows in resistor 76, and therefore no voltage drop occurs thereacross as far as this source is concerned. However, manifold pressure actuated sliders 72 and 102 are connected by a circuit including resistor 76, the whole of secondary winding 107, and resistor 106, and if a difference in manifold pressure exists, the sliders are at different potentials and current proportional to the voltage difference flows in resistors 76 and 106. The IR drop in resistor 76 due to this current comprises a further voltage in the input to amplifier 56.

In response to the total voltage on amplifier 56, motor 54 is energized: it operates until the input voltage to the amplifier is reduced to zero by adjustment of slider 62. At the same time the motor adjusts the position of throttle 51, which results in a change in the attack angle of the craft. When the power control system is in balance there is no output from bridge 115, when no voltage drop appears across resistor 76, and when equal and opposite voltages are provided by voltage dividers 63 and 140.

In like manner, the right throttle amplifier controls the operation of throttle motor 84; this system being balanced when there is no output from bridge 115, when no voltage drop appears across resistor 106, and when equal and opposite voltages are provided by voltage dividers 93 and 140.

It will be seen that the power control apparatus acts as a useful supplement to the automatic pilot. If the latter is adjusted to cause level flight at the beginning of a long flight, a gradually increasing rate of climb results as fuel is consumed, since this not only shifts the center of gravity but also reduces the total load. The tendency to nose high flight is overcome by operation of vertical gyroscope 26, but if the throttle settings remain the same the power available becomes increasingly greater than that necessary to maintain level flight, and climb of the craft results. As soon as a vertical component is given to the craft's motion, however, the attack angle vane 161 displaces slider 123, unbalancing bridge 115, and the power control apparatus goes into action, reducing the throttle settings until the attack angle is again that desired.

When normal flight has been completed and it is desired to make a landing, instrument landing apparatus 11 is brought into action. By switching means discussed in detail in the copending application referred to above, localizer receiver 30 only is made effective during the early portion of the approach. Unidirectional voltage is supplied to networks 40 and 42, and hence to units 43 and 45. The output from unit 43 is impressed upon the input to aileron channel 21 through conductor 295, fixed contact 260, switching contact 254, and conductor 298. In like manner the input from unit 45 is impressed upon the input to rudder channel 20 through conductor 296, fixed contact 261, switching contact 255, and conductor 297. Thus there is superimposed, on the normal control of the rudder and ailerons of the craft exerted by the automatic pilot, further control from the instrument landing apparatus which causes the craft to seek and travel along the localizer beam, so that it is moving directly toward the desired point of landing regardless of cross wind and other disturbing factors. The elevator channel of the automatic pilot and the entire power control apparatus remain unaffected.

During the latter portion of an instrument approach, glide path receiver 32 is also put into operation, supplying a unidirectional voltage in network 41 and thence to unit 44. The output of unit 44 is impressed by conductor 149 on the input to elevator channel 22 of the automatic pilot, and also on the primary winding 150 of transformer 147. As will be seen in Figure 1, the output from transformer 147 is effective in the same sense in both the throttle amplifier circuits. The result is that both the engines as well as the elevators of the craft are controlled so as to cause it to move down a path having a preselected slope determined by the radiations from the ground station of the instrument landing system. The angle of this slope is of course known, and knob 163 may be adjusted to change the desired attack angle by this amount. By a further refinement of the power control apparatus, not shown in this application but disclosed in the co-pending application referred to above, it is possible to make this change automatic, but the manual arrangement shown here has advantages of simplicity and low cost.

The structure thus far described in operation is not of itself new in the present application, but does form an inventive combination with crab angle receiver 13, whose operation will now be discussed.

The wave front of the radio signal from the localizer transmitter is shown at 310 in Figure 1, at the moment it reaches the center of antenna 171, and makes an angle $\alpha$ with the axis of the antennas. The latter are spaced apart by a distance L, and in order to reach the center of antenna 170 the wave front must travel a distance $d$ which has the value L sin $\alpha$. If L is expressed in units of the wave length of the radio signal, the value of $d$ comes out in the same units, and may be interpreted as a phase angle $\beta$ between the voltages induced in the two antennas, that in antenna 171 of course leading. It is found that if $L=1.44\lambda$, then $\beta$ is 90° when $\alpha$ is 10°: this is a convenient arrangement which will be assumed in the subsequent discussion.

The antenna voltages are amplified in amplifiers 175 and 172 which, as previously pointed out, must be phase stable so that the change in phase of a signal transmitted through each of them is constant. The amplifiers should also either have the same amount of over-all phase shift, or be adjustable so that for a situation where $\alpha$ equal zero the amplifier outputs are fully in phase.

Figure 6:
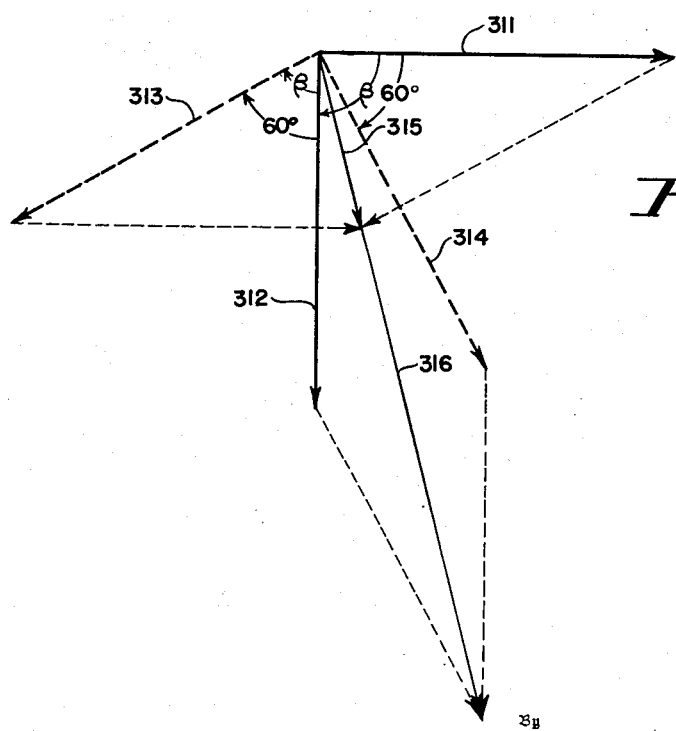
Figure 6 is a vector diagram illustrative of certain voltage relationships.

Figure 6 is illustrative of voltage relations in the drift angle receiver. Vector 311 shows the otuput of amplifier 175 and vector 312 that of amplifier 172, which lags the former by the angle $\beta$ of 90° if the drift angle $\alpha$ is 10°, as will be assumed. These voltage outputs are impressed directly on rectifiers 186 and 181, with that difference in phase. In addition, the output of amplifier 172 is impressed on rectifier 186 through lag line 196, as shown by vector 313, while the output of amplifier 175 is impressed on rectifier 181 through the lag line, as shown by vector 314; in each case a lag of 60° is shown as being introduced by the characteristics of the lag line.

The voltage applied to rectifier 186 is the sum of the voltages represented by vectors 312 and 314, and is shown by vector 316. The voltage applied to rectifier 181 is the sum of the voltages represented by vectors 311 and 313, and is shown by vector 315. It is obvious for the case shown that the input to rectifier 186 is much greater than that to rectifier 181, and the rectifier outputs of course have the same relationship.

As $\alpha$ decreases from 10°, $\beta$ decreases from 90°: vectors 315 and 316 change direction together, and change in magnitude oppositely, until when $\alpha=0$ ($\beta=0$) the vectors are of equal magnitude; the voltages on rectifiers 181 and 186 are then equal. The rectifier outputs are so interconnected that under these conditions no voltage is supplied to indicator 205, or to networks 206 and 207: for any other value of $\alpha$ a undirectional voltage of one polarity or the other is supplied to the indicator and the networks.

The output impedances of amplifiers 172 and 175 should within reasonable limits be equal, and of the same value as the characteristic impedance of lag line 196, for best results with this system.

Since the function of the crab angle receiver is to be to control the aircraft, it is necessary that its control output be given such characteristics that the combination of the receiver, the automatic pilot, and the aircraft comprises a stable system, for signals having the characteristics to be found in a radio arrangement of this sort. Networks 206 and 207 are hence generally similar to networks 40, 41 and 42, embody-ing such integrating or differentiating circuits as are desirable to most safely control the craft in accordance with the signals received by antennas 170 and 171. It should be pointed out that all of these networks are provided to give more refined operation to a system which would still function if they were omitted, although perhaps in a cruder fashion.

Before continuing with the operation of drift angle receiver 13 in the system, the nature of triggering apparatus 14 should be discussed. As previously pointed out, altimeter 242 gives a D. C. output which varies with the height of transducer 243 above the surface of the earth. This voltage is connected, in series with rectifier 286 and a voltage from voltage divider 283, across a resistor 287 in the input to amplifier 267. The polarities of the voltages are so selected that, in the absence of voltage from altimeter 242 current flows through rectifier 286; the presence of more than a predetermined output voltage from the altimeter reverses the polarity of the system and current flow is interrupted by rectifier 286. When this happens no voltage drop appears across resistor 287, no input is supplied to D. C. amplifier 267, and relay 240 is not energized even though switch 273 is closed. The magnitude of voltage from altimeter 242 above which no operation of relay 240 can take place is adjusted by means of voltage divider 283, in accordance with the following principle.

The number and arrangement of runways at airports large enough to be equipped with instrument landing transmitters is such that a craft need never make an approach with the wind more than 30 degrees from straight ahead, as best shown by vector 320 in Figure 5. This may be resolved into a cross wind component and a head wind component. Surface winds in excess of 40 miles per hour are seldom encountered: the cross track component 321 of such a wind is 20 miles per hour. This combined with a landing airspeed of 120 miles per hour gives a maximum crab angle of not quite 10 degrees for craft of the type suitable for use in the practice of the invention.

It has been found that an automatic pilot is capable of removing yaw by rudder displacement alone at a rate of at least 10 degrees per second. Thus, if a signal to the automatic pilot were given when the craft was above ground by the distance it would descend in one second, this angle of ten degrees would be exactly removed at the instant of touchdown. Allowing for some delay and some inaccuracy in the altimeter, an interval of 1.3 seconds before the instant of touchdown is adequate opportunity for drift angle removal.

As shown in Figure 4, a craft following a landing beam is making a descent down a slope of from 2 to 2½ degrees with respect to the horizontal. The general value of the angle is 2½ degrees, which means, for craft traveling at 120 miles per hour, a rate of descent of 460 feet per minute, or 7.6 ft. per second. Triggering apparatus 14 should thus be set to operate when the craft is 1.3×7.6 or about 10 ft. above the ground. For different angles of glide path slightly different values should be used, and these may be obtained by adjusting the slider of voltage divider 283.

Slider 285 is adjusted to a position where the voltage from the slider to terminal 244 is just equal to the output of altimeter 242 at an elevation of 10 ft. So long as this altitude is exceeded, rectifier 286 prevents the flow of current in resistor 287, and amplifier 267 does not energize relay 240: instrument landing apparatus 11, power control apparatus 12 and automatic pilot 10 are in control of the craft. As soon as the craft comes within 10 ft. of the ground, rectifier 286 permits the flow of current in resistor 287, amplifier 267 energizes relay 240, and control of the heading of the craft is transferred to drift angle receiver 13, the method of control depending upon the position of switches 217 and 223.

First assume that switches 217 and 223 are both thrown to the left, which is their normal condition: operation of relay 240 then has no effect on the elevator channel of the automatic pilot, but does have an effect on the rudder and aileron channels of the automatic pilot and on the power control system.

The control circuit for the rudder channel may be traced through conductor 297, switching contact 255, fixed contact 264, conductor 232, switching contact 221, fixed contact 216, and conductor 215 to unit 210, the circuit being completed through ground connections 214 and 28. If the craft is in the localizer plane and heading toward the localizer receiver, no signal is applied to the rudder. If the craft is not headed toward the localizer transmitter, a signal is transmitted to the rudder channel to deflect the rudder to head the craft properly: the signal from the localizer receiver is of course cut off. The likelihood that the craft is appreciably displaced from the localizer plane at this point in the approach is remote, but in any case the drift angle receiver causes the craft to head toward the localizer transmitter so that it will touch down, possibly a few feet left or right of the center of the runway, but heading in the direction of its motion.

The control circuit for the aileron channel may be traced through conductor 298, switching contact 254, fixed contact 263, and conductor 235 to unit 211, the circuit being completed through ground connection 230 and 28. In many craft there is no necessity for any signal in the aileron circuit, since a skidding turn is desired. Some craft, however, have a tendency to roll upon application of rudder only, and network 207 functions to supply only enough aileron signal to prevent the roll, which would be dangerous at this low altitude. In any event the control exerted by aileron operation at the landing speed is greatly diminished, and by the time the craft establishes contact with the ground the effect of ailerons may largely be neglected.

The control exerted by rudder also decreases as the air speed decreases, while of course the cross wind remains the same. To insure continuing satisfactory crab angle removal, differential control of the throttles of the craft is also accomplished, the signal for this purpose being supplied to primary winding 111 of transformer 110 through conductor 114, switching contact 253, fixed contact 262, conductor 234, switching contact 225, fixed contact 222, conductor 218, fixed contact 216, and conductor 215, from unit 210, and through ground connectors 214 and 113.

It will be seen that any voltage induced in the secondary winding 107 from primary winding 111 acts in opposite senses in the two throttle amplifier circuits, thus causing one throttle to be advanced and the other to be retarded. This effect is of course opposed by the equalizer circuit, including pressure responsive devices 53 and 83, but is of greater magnitude so that the engines deliver different amounts of power, thus tending to change the heading of the craft in the desired direction even after the useful control range of the rudder has been passed.

If it is desired to dispense with differential throttle control, it is only necessary to close switch 223 to the right as seen in Figure 1. The primary winding 111 of transformer 110 is then short circuited through ground connections 113 and 231, fixed contact 224, switching contact 225, conductor 234, fixed contact 262, switching contact 253, and conductor 114, and the power control apparatus remains unaffected by operation of relay 240.

On the other hand it may be desired to dispense with the rudder control, particularly after the craft has touched the ground. This may be done by closing switch 217 to the right in Figure 1, connecting fixed contact 264 to fixed contact 261 through conductor 232, switching contact 221, fixed contact 220, and conductor 233, and thus restoring control of the rudder to the instrument landing apparatus, so the craft tends toward the center of the runway. In this fashion the rudder and differential throttle control may be caused to reinforce one another in the control of effect in craft.

It is not desirable to perform the initial removal of crab angle by means of differential throttle control alone, since this is not only sluggish in action, but has a significant rolling effect on an airborne craft.

The holding circuit including switch 273 functions to prevent increase in the altitude of the craft subsequent to operation of the relay—due for example to gusts of wind—from reversing the controls, and thus acts as a safety precaution.

Figure 2:
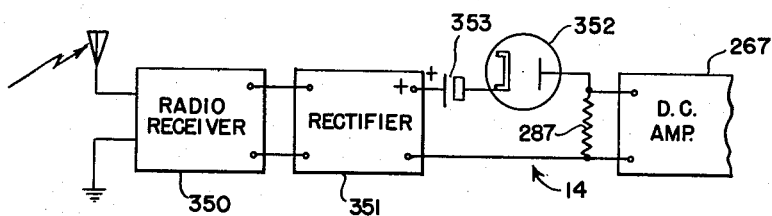
Figures 2 and 3 are fragmentary views showing modification of the system in Figure 1.

The general location of the localizer and glide path transmitters with respect to the touchdown point on the runway, and to the localizer beams, two equipotential lines of which have been reproduced, are shown in Figure 5, and Figure 4 gives the same information relative to the glide path. These figures also suggest that operation of the triggering apparatus may be initiated by a transmitting antenna 349 embedded in the landing strip at a selected distance from the touchdown point. Just as the craft which has a given condition of air speed and maximum cross wind components should be subjected to crab angle removal when ten feet above the surface, so as an alternative the drift angle removal should be initiated when the craft is 230 feet away from the touchdown point. A modification of Figure 1 according to this principle is shown in Figure 2, where a radio receiver 350 is shown as energizing a first rectifier 351. Receiver 350 is tuned to the frequency of triggering antenna 349 which has sharp vertical directional properties. The output of rectifier 351 is connected in series with the battery 353, a diode rectifier 352, and resistor 287 so that the voltage developed thereacross is applied to amplifier 267. By suitably adjusting the gain of receiver 350 a pulse of unidirectional voltage sufficient to cause operation of relay 240 results when the craft passes through the field of the triggering antenna, and operation of the relay is maintained by the holding circuit.

Figure 3:
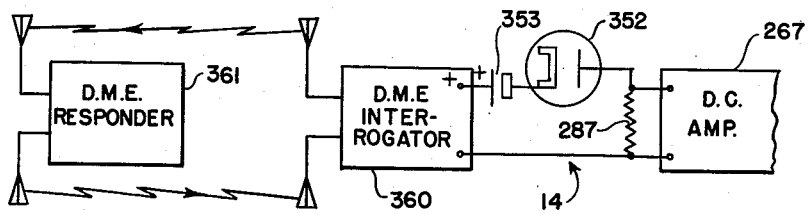

It is not required that a distance directly associated with the last 1.3 seconds of the craft's descent be used to control triggering apparatus 14. A further modification of the invention is shown in Figures 3 and 5 for accomplishing the same results. Here the interrogator 360 of a Distance Measuring Equipment installation is carried by the craft, and the responder 361 is located at the airport in a spot where it will not interfere with movement of craft: the position of responder 361 should of course not be on or near the line transverse to the landing strip at the point 1.3 seconds from touchdown, to avoid unnecessarily reducing the sensitivity of the arrangement. As shown in Figure 5, the distance D from responder 361 to the triggering point is measured accurately. The triggering point is thus determined by the intersection of the glide path with a circle about responder 361 having a desired radius. The output of the interrogator, a unidirectional voltage, is applied to the circuit including battery 353, diode 352, and resistor 287 as before, and functions in the same manner.

The Distance Measuring Equipment is a well known system, described in the "Third Commonwealth and Empire Conference on Radio for Civil Aviation, 1945," pages 197 to 205.

*Summary*

In the foregoing specification I have described a complete system for automatically removing the crab angle of a craft flying down an instrument landing beam, just before the craft touches the ground. Means are shown for affecting the ailerons, rudder, and throttles of the craft to accomplish this, and can be used in a variety of combinations. The invention includes a specific receiver for responding to crab angle, and also includes means substituting this receiver for the localizer receiver of the instrument landing system in control of the craft. Reversal of the substituting means is specifically prevented, and the substituting means may be adjusted in accordance with the actual angle of the glide path.

Three modifications of the invention are shown. In the first the change from localizer control to crab angle control of the craft is made in response to altitude. While a supersonic altimeter is specifically described, it will be obvious that a radio altimeter, or even a suitable barometic altimeter giving an electrical output, could readily be substituted for the supersonic altimeter.

A second modification of the invention discloses means triggering the substituting means in accordance with distance along the landing strip from the touchdown point, by means of a transmitting antenna imbedded in the landing strip at the desired distance from a touchdown point, which transmits the signal to a receiver in the craft, the receiver initiating the substitution by the same means as before.

The third modification of the invention teaches controlling the triggering apparatus in accordance with the output of a Distance Measuring Equipment interrogator, carried by the craft, and cooperating with a responder located at the airport at a known distance from the triggering point.

Numerous objects and advantages of my invention have been set forth in the foregoing description, together with details of the structure and function of the invention, and the novel features thereof are pointed out in the appended claims. The disclosure however is illustrative only, and I may make changes in detail, especially in matter of shape, size and arrangement of parts, within the principle of the invention, to the full extent indicated by the broad general meaning of the terms in which the appended claims are expressed.

I claim as my invention:

1. In apparatus of the class described, in combination: crab angle responsive means giving an output in accordance with angular deviation between the heading of a craft and its direction of movement; means for changing the heading of the craft in accordance with the response of said responsive means; and altitude responsive means causing actuation of said second named means.

2. In apparatus of the class described, in combination: means normally controlling the engines of a craft so as to prevent power yaw; crab angle responsive means giving an output in accordance with deviation between the heading of said craft and its direction of motion; and means actuated by said last named means for overriding said first named means to differentially adjust the engines of said craft so as to cause power yaw to remove said deviation.

3. In apparatus of the class described, in combination: an automatic pilot for controlling the movement of a craft including interconnected rudder operating means, aileron operating means, and stabilizing means; an instrument landing system including means giving an output when translated away from the center of a landing path; a crab angle responsive system including means giving an output when the heading of said craft is not aligned with the direction from said craft to the end of said path; control means connected to said automatic pilot, said instrument landing system, and said crab angle responsive system, and movable between a normal position, in which said rudder and aileron operating means are controlled by said instrument landing system, and an operated position, in which said rudder operating means is controlled by said crab angle system and said aileron operating means is controlled by said stabilizing means; means giving an output in response to the occurrence of a condition indicative that the craft is about to land; and means connected to said last named means and said control means for moving said control means into said operated position when said last named output occurs.

4. In apparatus of the class described, in combination: power control means for the engines of a multi-engine craft; means responsive to a quantity which varies with the operation of each of the engines of said craft; equalizing means controlling operation of said first named means in accordance with the responses of said second named means; crab angle responsive means giving an output in accordance with angular disparity between the heading of said craft and the bearing of a destination from the craft; and differential power control means connected to said last named means and said equalizing means for overriding said equalizing means in accordance with the response of said crab angle responsive means.

5. In apparatus of the class described, in combination: an automatic pilot having aileron control components stabilized by a vertical gyroscope and rudder control components stabilized by a directional gyroscope; a localizer receiver for superimposing a normal overriding control on both said components in accordance with departure of a craft from a landing beam; a crab angle receiver for superimposing an independent overriding control on at least one of said components in accordance with deviation between the heading of a craft and its direction of movement; and means for substituting said second named overriding control for said first named overriding control.

6. In apparatus of the class described, in combination: a crab angle measuring system; an instrument landing system; an automatic pilot for regulating the attitude of a craft about roll, pitch and yaw axes; a throttle control system; a locking relay normally maintaining said instrument landing system in control of said automatic pilot and of said throttle control system; and means for actuating said relay into a locked position in which said drift angle measuring system acts through said automatic pilot to control the attitude of said craft about at least said yaw axis, and through said throttle control system to differentially control the throttles of the craft.

7. In apparatus of the class described, in combination: means for normally actuating a plurality of control surfaces of an aircraft to control the heading thereof so that the craft follows a predetermined path; means for normally actuating controls of a plurality of power plants driving the craft so that no power yaw is produced; crab angle responsive means giving an output in accordance with angular disparity between the heading of the chaft and the bearing of a destination from the craft; and means connecting said last named means for overriding at least one of said actuating means so as to reduce said derivation.

8. In apparatus of the class described, in combination: heading control means for determining the direction of movement of a craft with respect to the ground; means normally actuating said heading control means so as to cause said craft to follow a selected ground path; crab angle responsive means giving an output in accordance with angular deviation between the heading of said craft and the direction of the end of said path from said craft; and means modifying the operation of said actuating means in accordance with said output.

9. Apparatus for controlling the horizontal movement of a craft having a pair of engines oppositely spaced laterally from the longitudinal axis of the craft, comprising, in combination: crab angle responsive means for giving a signal in accordance with angular disparity between the heading of the craft and the bearing of a destination from the craft; means for severally adjusting the effective power outputs of the engines in accordance with signals supplied thereto; and means connecting said responsive means to said adjusting means for supplying said signal in different fashions thereto, so as to differentially control said engines in accordance with said disparity.

10. In apparatus of the class described, in combination: means giving a first output in accordance with departure of a craft from a selected ground path passing through a destination; crab angle responsive means giving a second output in accordance with angular disparity between the heading of the craft and the bearing of the destination from the craft; heading control means energizable to cause angular movement of the craft about its vertical axis; turn control means, including said last named means, energizable to cause concurrent angular movement of the craft about its vertical and longitudinal axes; means connected to said responsive means and said control means for energizing said turn control means in accordance with said first output; and means connected to said responsive means and said control means for energizing said heading control means in accordance with said second output.

11. In apparatus of the class described, in combination: means giving a first output in accordance with departure of a craft from a selected ground path passing through a destination; crab angle responsive means giving a second output in accordance with angular disparity between the heading of the craft and the bearing of the destination from the chaft; heading control means energizable to cause angular movement of the craft about its vertical axis; turn control means, including said last named means, energizable to cause concurrent angular movement of the craft about its vertical and longitudinal axes; means connected to said responsive means and said control means for causing normal energization of said turn control means in accordance with said first named output; and means connected to said responsive means and said control means for interrupting said normal energization and cause energization of said heading control means in accordance with said second named output.

12. Apparatus for controlling the movement of a craft having a pair of engines spaced laterally from the longitudinal axis of the craft, comprising, in combination: means for normally adjusting control surfaces of the craft in accordance with a signal, to determine its horizontal component of movement; means for normally adjusting the engines of the craft simultaneously in the same sense in accordance with a signal, to determine the effective power propelling the craft; crab angle responsive means for giving a signal output determined by angular disparity between the heading of the craft and the bearing of a destination from the craft; means interconnecting said first and last named means so as to supply said signal output as an additional signal to said first named adjusting means, to cause adjustment of said control surfaces in accordance with said angular disparity; and means interconnecting said second and last named means so as to supply said signal output to said second named means as additional signals of two different characters, to cause differential adjustment of said engines in accordance with said angular deviation.

13. Apparatus for controlling the movement of a craft having attitude control means and having a pair of engines oppositely spaced laterally from the longitudinal axis of the craft, in combination: normally operative means for adjusting the attitude control means of the craft in accordance with departure of the craft from a selected ground path passing through a destination; normally inoperative means for differentially adjusting the engines of the craft in accordance with angular disparity between the heading of the craft and the bearing of the destination from the craft; switching means connected to said adjusting means for preventing operation of said normally operative means, and causing operation of said normally inoperative means; and means responsive to a condition indicative that the craft is about to land for actuating said switching means upon the occurrence of the condition to which said switching means is responsive.

14. In apparatus of the class described, in combination: first radiant energy controlled means for giving a first output determined by departure of a dirigible craft from a selected ground path passing through a destination; a second radiant energy responsive means for giving a second output determined by angular disparity between the heading of the craft and the bearing of the destination from the craft; means for controlling the heading of the craft in response to a signal supplied thereto; means interconnecting said means and operable between a normal condition, in which said first output is supplied as a signal to said controlling means, and an adjusted condition, in which said second output is supplied as a signal to said control means; means responsive to a condition indicative that the craft is about to land; and means connecting said last named means to said interconnecting means so as to cause operation of said interconnecting means into said adjusted condition upon the occurrence of the condition to which said condition responsive means is responsive.

15. In apparatus of the class described, in combination: crab angle responsive means giving an output in accordance with the heading of a craft and its direction of movement, control surface operating means for changing the heading of the craft, further means connected to said operating means and said responsive means for causing operation of said operating means in accordance with the response of said responsive means; and altitude responsive means connected to said further means for causing actuation of said further means.

16. In apparatus of the class described, in combination: crab angle responsive means giving an output in accordance with angular disparity between the heading of a craft and the bearing of a destination from the craft; means for changing the heading of the craft in accordance with the response of said responsive means; further means responsive to a condition indicative that the craft is about to land; means connecting said further means to the heading changing means to cause actuation thereof upon the occurrence of said condition; and means connected to said last named means for preventing interruption of said actuation in the event of subsequent change in said condition.

References Cited in the file of this patent
UNITED STATES PATENTS

| Number | Name | Date |
|---|---|---|
| 2,133,285 | Dunmore | Oct. 18, 1938 |
| 2,207,709 | Bates | July 16, 1940 |
| 2,266,410 | Busignies | Dec. 16, 1941 |
| 2,322,285 | Crane et al. | June 22, 1943 |
| 2,364,624 | Dugan | Dec. 12, 1944 |
| 2,372,185 | Wittkuhns | Mar. 27, 1945 |
| 2,397,476 | Maxson et al. | Apr. 2, 1946 |
| 2,403,727 | Loughren | July 9, 1946 |
| 2,452,675 | Newitt | Nov. 2, 1948 |
| 2,496,809 | Moseley | Feb. 7, 1950 |